UNITED STATES PATENT OFFICE.

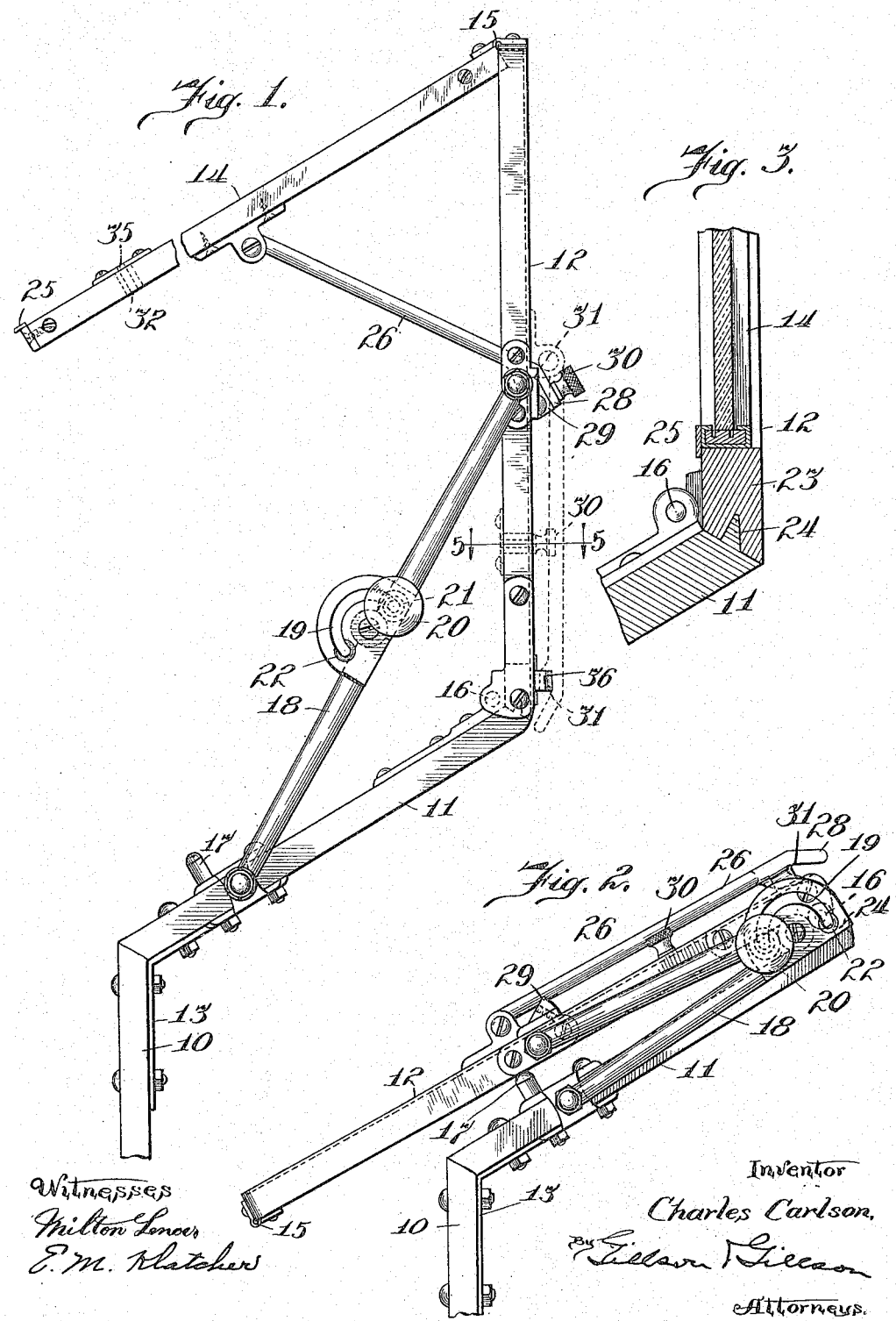

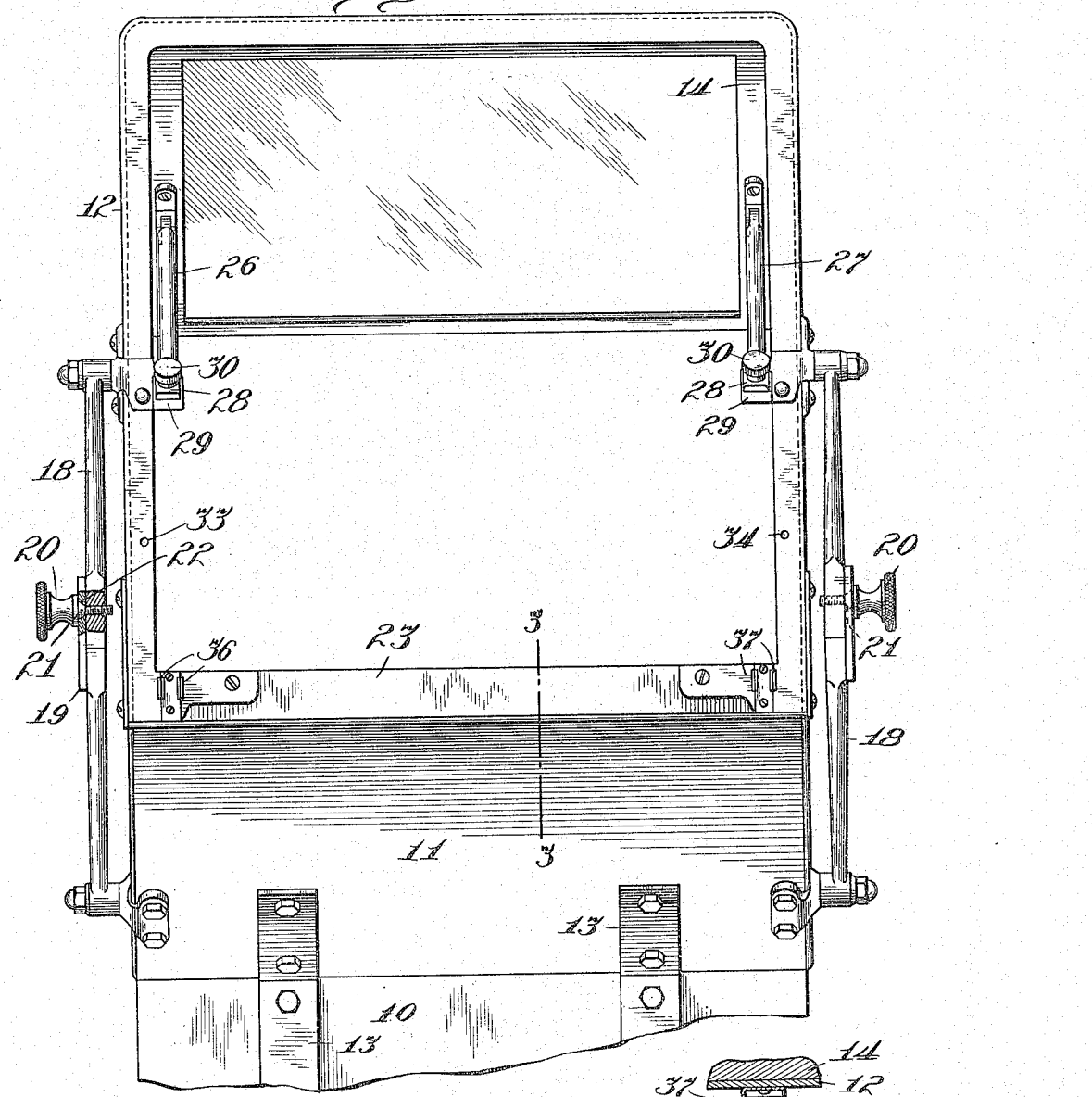

CHARLES CARLSON, OF BLUE ISLAND, ILLINOIS, ASSIGNOR TO CHICAGO COACH & CARRIAGE CO., A CORPORATION OF ILLINOIS.

WIND-SHIELD FOR VEHICLES.

1,129,451.    Specification of Letters Patent.    Patented Feb. 23, 1915.

Application filed October 7, 1910. Serial No. 585,882.

*To all whom it may concern:*

Be it known that I, CHARLES CARLSON, a citizen of the United States of America, and resident of Blue Island, county of Cook, and State of Illinois, have invented certain new and useful Improvements in Wind-Shields for Vehicles, of which the following is a specification and which are illustrated in the accompanying drawings, forming a part thereof.

The invention relates to wind shields especially adapted for use on automobiles, and of the type known as the zigzag shield.

The object of the invention is to improve upon this type of wind shield by increasing its efficiency and rigidity and providing for the opening of the sash of the upper section to permit a view of the road in advance of the vehicle when the weather conditions are such as to cloud the glass.

The invention consists in a structure such as hereinafter described and illustrated in the accompanying drawings, in which—

Figure 1 is a detail side elevation of the shield in position for service; Fig. 2 is a similar view, the shield being folded; Fig. 3 is a detail section on the line 3—3 of Fig. 4; Fig. 4 is a rear elevation of the shield in position for service, its support being shown in detail; Fig. 5 is a detail section on the line 5—5 of Fig. 1; and Fig. 6 is a detail of the lower end of the brace-arm used in the device.

There is shown in the drawings at 10 the upper portion of the dash of a vehicle, or an extension thereof. The shield comprises two sections 11, 12. The lower section 11 is preferably opaque, and is rigidly secured to the dash 10 by means of suitable brackets 13, and in such position that it inclines backwardly or toward the driver's seat. The upper section 12 comprises a rectangular frame, to which the numeral is applied, and a glazed sash 14 fitted within the frame and hinged thereto at the top, as shown at 15, so that it may swing forwardly. The upper section 12 is hinged to the upper edge of the lower section 11, as shown at 16, in such manner that it may swing downward and forward from the position shown in Fig. 1 to the position shown in Fig. 2, and when in its lower position it rests upon the cushioning bumpers 17 carried by the lower section. The upper section is braced by means of a jointed arm 18, which flexes downwardly and carries a locking device consisting of a slotted quadrant 19, attached to one of the members, and a binding screw 20 carried by the other and in sliding engagement with the slotted quadrant. The binding screw 20 is provided with a beveled shoulder 21 on its shank, which enters a complementary counterbore 22 at either end of the slotted quadrant 19, thereby positively locking the joint of the arm in either of the extreme positions to which it may be moved. The lower edge of the bottom rail 23 of the section 12 is longitudinally channeled to receive a rib 24 formed upon the upper edge of the section 11, thereby forming a weatherproof joint when the upper section is raised. At the lower edge of the sash 14 and adjacent the front face of the sash there is a depending lip 25 for engaging the front face of the rail 23 when the sash is closed, thereby forming a weatherproof joint.

Brace arms 26, 27, are pivotally attached to the inner faces of the side rails of the sash 14 for supporting it when open, as shown in Figs. 1 and 4. The lower ends of these brace-arms are flattened, as shown at 28, to rest upon a bearing block 29 secured to the inner face of the side rail of the section 12, and this flattened portion and the block are apertured to receive a screw-bolt 30. Preferably the arms 26, 27, are also provided adjacent their lower ends with undercut shoulders 31, for fitting upon the upper edges of the blocks 29, which are made of complementary form, thereby providing a more secure and rigid attachment of the arm to the block.

The side rails of the section 12 are formed of angle bars, as plainly shown in Fig. 5, thereby providing a seat for the sash when closed. The side rails of the sash are apertured, as shown at 32, to register with apertures 33, 34, in the side rails of the upper shield section, and preferably these apertures are adapted to receive the bolt 30, which is required for use in connection with the brace-arms 26, 27, only when the sash is open. Preferably a threaded bushing 35 is fitted within each of the apertures in the sash, for engaging the screw. On the inner face of the lower rail of the shield section 12 there is provided two pairs of spring fingers 36, 37, adapted to receive and hold the brace-arms 26, 27, when the sash is closed, the shoulder 31 of the arm entering between the spring fingers.

In ordinary use the sash 14 is closed and is locked to the upper section of the shield by means of the screws 30, the brace-arms 26, 27, being held against movement by the spring fingers 36, 37. This section is supported in its upright position by the jointed arms 18, which are straightened to the position shown in Fig. 1 and securely locked by means of the screw 20, the beveled shoulder of which fits within the counterbore at the upper end of the slot of the quadrant 19. Should the glass of the sash 14 become clouded by rain or snow, or for other reason, or should the driver prefer to admit some air, the sash is raised to the position shown in Fig. 1 and there braced by the arms 26, 27, the lower ends of which are brought into engagement with the blocks 29, and are secured thereto by the screws 30, now transferred from their original position. The sash when in this position is elevated sufficiently to permit a view of the road in front of the vehicle from the driver's seat, while at the same time it protects the driver from the weather. When not in use the upper section 12 is folded down to the position shown in Fig. 2, and is securely locked, so as to prevent rattling, by means of the screws 20, the shoulders of which now engage the counterbore 22 at the lower end of the slotted quadrant 19.

I claim as my invention—

In a wind shield, in combination, a fixed lower inclined section, an upper section hinged to the lower section to swing forwardly, a glazed sash carried by the upper section and hinged thereto at its upper edge, a brace arm pivoted to the sash and having an undercut shoulder at its lower end, a bearing block on the frame of the upper shield section complementary to the shoulder, and means for securing the brace arm to the bearing block.

CHARLES CARLSON.

Witnesses:
 Louis K. Gillson,
 E. M. Klatcher.